United States Patent [19]

Smith

[11] 4,178,433

[45] Dec. 11, 1979

[54] PROCESS FOR MAKING ARYLENE SULFIDE POLYMERS

[75] Inventor: Harry A. Smith, Midland, Mich.

[73] Assignee: The Dow Chemical Company, Midland, Mich.

[21] Appl. No.: 904,834

[22] Filed: May 11, 1978

[51] Int. Cl.$^2$ .............................................. C08G 75/00
[52] U.S. Cl. ...................................... 528/381; 528/86
[58] Field of Search ................................. 528/86, 381

[56] References Cited

U.S. PATENT DOCUMENTS

| 2,513,188 | 6/1950 | Macallum | 260/79 |
|---|---|---|---|
| 2,538,941 | 1/1951 | Macallum | 260/79 |
| 3,274,165 | 9/1966 | Lenz et al. | 260/79 |
| 3,311,663 | 3/1967 | Degeorges et al. | 528/381 |
| 3,317,487 | 5/1967 | Smith | 260/79 |

OTHER PUBLICATIONS

Fujisawa et al., J. Polymer Science (B) 8(1), pp. 19–24 (1970).

Primary Examiner—Melvyn I. Marquis

[57] ABSTRACT

Polyarylene sulfide resins essentially free of disulfide linkages are obtained by reacting $S_2Cl_2$ or $S_2Br_2$ with a benzenoid aromatic compound having 0–2 substituents per benzene ring at about 90° C.–350° C. in the presence of a metal halide Friedel-Crafts catalyst. The process is conveniently carried out at 90° C.–150° C. in inert solvent solution from which the polymer precipitates as it is formed.

10 Claims, No Drawings

PROCESS FOR MAKING ARYLENE SULFIDE POLYMERS

BACKGROUND OF THE INVENTION

The present invention relates to a new process for making polyarylene sulfides. These polymers are useful adhesives and thermoplastic molding resins and can also be intermediates for making infusible thermoset materials.

Aromatic sulfide resins have been made in the past by various methods including reacting a chlorinated benzene with sulfur and sodium sulfide (Macallum, U.S. Pat. No. 2,513,188) and by heating a metal salt of halothiophenol (Lenz et al., U.S. Pat. No. 3,274,165). These methods are effective but have various disadvantages such as expensive solvents, long reaction times, and difficult separation and purification procedures. More recently, a method has been described whereby sulfur monochloride was reacted with phenyl ether at a relatively low temperature to make a low molecular weight polymer containing both monosulfide and disulfide linkages (Fujisawa et al., J. Polymer Science (B), 8 (1) 19-24 (1970). Polymers containing disulfide linkages are undesirable because the disulfide groups are subject to oxidative degradation and the polymers are thermally unstable.

SUMMARY OF THE INVENTION

It has now been found that an excellent yield of relatively high molecular weight polyarylene sulfide resin essentially free of disulfide linkages is obtained by heating a mixture of a benzenoid arylene compound having 1-3 benzene rings in the molecule and 0-2 substituents per benzene ring with about one mole per mole of arylene compound of $S_2Cl_2$ or $S_2Br_2$ at a temperature of about 90° C.-350° C. in the presence of a metal halide Friedel-Crafts catalyst. Preferably, the reaction is carried out at about 90° C.-150° C. with the reactants dissolved in an inert solvent, under which conditions the polyarylene sulfide resin product precipitates from the reaction solution substantially as it forms.

DETAILED DESCRIPTION OF THE INVENTION

Arylene compound reactants suitable for use in the process include benzene and halogenated benzenes such as chlorobenzene, fluorobenzene, dichlorobenzene and bromobenzene; alkylbenzenes such as toluene, xylene, ethylbenzene and butylbenzene; phenyl ethers such as anisole, phenetole, diphenyl ether and diphenoxybenzene as well as substituted ethers such as ditolyl ether and chloroanisole; and other aromatic hydrocarbons and their substituted derivatives such as biphenyl, terphenyl, phenyl biphenylyl ether, methylbiphenyl, chlorobiphenyl and the like. Such compounds can be represented by the general formula:

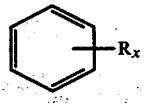

wherein x is 0-2 and each R is halogen, lower alkyl, lower alkoxy, phenyl, phenoxy, biphenyl, biphenoxy or a phenyl, biphenyl, phenoxy or biphenoxy radical having a halogen, lower alkyl, or lower alkoxy substituent. Polymers having uniformly distributed chlorine atoms in their structure for cross-linking purposes are readily made by using chlorobenzene or dichlorobenzene mixed with benzene or other such benzenoid compound as the arylene reactant.

Preferably, sulfur monochloride is the sulfur halide reactant which is employed in a proportion of about 0.9-1.3 moles per mole of aromatic compound. Best results are usually obtained with about 0.95-1.1 moles of $S_2Cl_2$. As the ratio of $S_2Cl_2$ to aromatic compound is raised above one, other reaction conditions remaining the same, the polymer product becomes increasingly cross-linked with a higher molecular weight and higher softening point. Above about 1.3 moles of $S_2Cl_2$, the polymer approaches infusibility and may be of little practical use.

The structure and properties of the polyarylene sulfide polymer are also dependent upon the temperature at which it is made. Using the preferred ratio of sulfur monochloride to benzene ring of about one to one, the polymer product is essentially linear with little or no cross-linking when made at about 90° C.-150° C. At about 175° C.-200° C., there is some cross-linking with resulting decreased solubility and increased softening point, and at 200° C.-300° C. the resulting more extensive cross-linking in the product causes significant changes in this direction. Of course, longer reaction times tend to accentuate these temperature effects.

The catalyst for the polymer-forming reaction is preferably ferric chloride. This may be added to the reaction mixture as powdered iron which reacts with the chloride present to form the catalyst. Other metal halides known as Friedel-Crafts reaction catalysts can also be used; for example, zinc chloride, aluminum chloride, boron trifluoride and stannic chloride. The quantity of catalyst is not critical as any significant amount will promote the reaction. Normally, about 0.1-1 percent of halide based on the total weight of reactants is used. However, at least about one mole of aluminum chloride or other aluminum halide per mole of aromatic reactant is required to minimize the formation of undesirable cyclization products. Thus, aluminum chloride is an operable catalyst but not one which is preferred.

The reaction can be carried out by merely mixing the reactants and catalyst and heating to the appropriate temperature whereupon the mixture solidifies as the polymer is formed. The solid reaction mixture can then be broken up and washed with water to remove hydrogen halide and catalyst. Any low molecular weight polymer present in the product can be extracted by washing with hot toluene or other aromatic hydrocarbon.

A convenient and preferred way of making the polymer comprises reacting the sulfur monohalide and aromatic reactant in inert solvent solution whereby the desired high molecular weight polyarylene sulfide precipitates as it is formed as an easily handled, essentially granular solid. Aromatic hydrocarbons having at least two strongly inactivating substituents or three moderately inactivating substituents and with appropriate melting and boiling points which are inert under reaction conditions are suitable solvents. Inactivating substituents are electron-withdrawing groups such as cyano and halogen. Trichlorobenzene and tetrachlorobenzene are preferred solvents. Aliphatic hydrocarbons and chlorinated aliphatic hydrocarbons such as tetradecane and perchloroethylene are also operable in the process.

EXAMPLE 1

A mixture of 167.8 g of $S_2Cl_2$, 97 g of benzene, and 1.65 g of $FeCl_3$ was heated at reflux temperature for 45 minutes, at which time the reaction mixture solidified. The solid mixture was ground up in a blender with 12 percent aqueous HCl, washed with water, and dried to obtain the theoretical quantity of a greenish solid melting over a broad range of 110° C.–220° C. This was stirred with hot toluene to extract low molecular weight material and leave 89 percent of the original product as a toluene-insoluble, yellow solid softening at 220° C.–240° C. The polymer was soluble in hot chlorodiphenyl ether. Melt viscosity at 303° C. was 3,600 poises, indicating an average molecular weight of about 7,500.

EXAMPLE 2

The procedure of Example 1 was repeated except that after solidification of the reaction mixture, the temperature was raised to 300° C. in 30 minutes and held there for another 30 minutes. This procedure yielded 99.8 percent of the theoretical quantity of polymer as a toluene-insoluble solid softening at 240° C.–295° C. and having a 303° C. melt viscosity of 135,000 poises, equivalent to an average molecular weight of about 12,700.

EXAMPLE 3

A solution of 167.8 g of $S_2Cl_2$, 97 g of benzene, and 2 g of $FeCl_3$ in 200 ml of 1,2,4-trichlorobenzene was heated at 100° C. for 19 hours. The granular polymer product was filtered from the hot reaction mixture to obtain the theoretical quantity of material which had a softening point of 220° C.–290° C. and a 303° C. melt viscosity of 66,200 poises or an average molecular weight of about 11,400. The polymer was insoluble in hot toluene but soluble in hot chlorodiphenyl ether. Sulfur analysis indicated that it was a polyphenylene sulfide similar to the products of Examples 1 and 2, all of these products being monosulfides containing essentially no disulfide or other polysulfide linkages.

By-product sulfur precipitated from the filtered reaction solvent when it cooled. Analysis of the solvent after removal of precipitated sulfur showed it to be unchanged 1,2,4-trichlorobenzene containing the $FeCl_3$ catalyst dissolved in it.

EXAMPLE 4

A mixture of 72.7 g of benzene, 45.7 g of p-dichlorobenzene, 167.8 g of $S_2Cl_2$, and 1.65 g of $FeCl_3$ was heated to reflux temperature in 30 minutes and held there for 15 minutes when the mixture solidified. The solid was then heated to 300° C. in 90 minutes and held at that temperature for 30 minutes. The product was broken up and washed with aqueous HCl, water, and hot toluene as before to obtain a 95 percent yield of chlorine-containing polyphenylene monosulfide polymer wherein phenylene and dichlorophenylene units were present in approximately the 3 to 1 molar ratio of the aromatic starting materials.

EXAMPLES 5–7

The procedure of Example 2 was repeated using different molar ratios of $S_2Cl_2$ to benzene. The yields and properties of the polymer products are listed in Table I, including the product of Example 2 for comparison.

TABLE I

| Mole Ratio $S_2Cl_2$/benzene | % Yield | Softening Pt., °C. | Ave. Mol. Wt. |
|---|---|---|---|
| 1:1 | 99.8 | 240–295 | 12,700 |
| 1.05:1 | 99.1 | 240–290 | 8,700 |
| 1.1:1 | 100 | 230–290 | 12,400 |
| 1.24:1 | 100 | 290–>320 | 16,200 |

EXAMPLE 8

Example 3 was repeated replacing the benzene with 114.2 g of toluene and the $FeCl_3$ with 2 g of $BF_3$ etherate. After 19 hours at 115° C. a solution was obtained. Removal of the solvent and unreacted reactants yielded 23.4 g of a soft solid. The low yield compared to Example 3 shows that toluene is an acceptable aromatic reactant while $BF_3$ is effective but not as active a catalyst as $FeCl_3$.

EXAMPLE 9

Example 3 was repeated replacing the benzene with 139.5 g of chlorobenzene. After 20 hours reaction, 25.7 g of 1,2,4-trichlorobenzene-insoluble polymer and 98.0 g of trichlorobenzene-soluble polymer were obtained. This indicates that while less reactive than benzene, chlorobenzene is also a suitable aromatic reactant.

I claim:

1. A process for making an arylene monosulfide polymer which comprises heating a mixture of a benzenoid arylene compound having 1–3 benzene rings in the molecule and having the structural formula

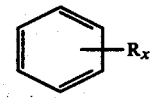

wherein x is 0–2 and each R is halogen, lower alkyl, lower alkoxy, phenyl, phenoxy, biphenyl, biphenoxy, or a phenyl, biphenyl, phenoxy, or biphenoxy radical having a halogen, lower alkyl, or lower alkoxy substituent with about one mole of a sulfur halide which is $S_2Cl_2$ or $S_2Br_2$ per mole of arylene compound at a temperature of about 90° C.–350° C. in the presence of a metal halide Friedel-Crafts catalyst and recovering from the heated mixture a polyarylene sulfide resin essentially free of disulfide linkages.

2. The process of claim 1 wherein the sulfur halide is $S_2Cl_2$.

3. The process of claim 2 wherein about 0.9–1.3 moles of $S_2Cl_2$ are present per mole of arylene compound.

4. The process of claim 2 wherein the metal halide catalyst is ferric chloride.

5. The process of claim 4 wherein the mixture of reactants is heated at about 90° C.–150° C. as a solution in a solvent which is unreactive under the conditions of the process and the polyarylene sulfide resin product is recovered as a precipitate from said solution.

6. The process of claim 5 wherein the solvent is trichlorobenzene.

7. The process of claim 5 wherein the arylene compound is benzene.

8. The process of claim 5 wherein the arylene compound is toluene.

9. The process of claim 5 wherein the arylene compound is chlorobenzene.

10. The process of claim 5 wherein the arylene compound is a mixture of benzene and p-dichlorobenzene.

* * * * *